L. H. COXE.
PRESSURE INDICATOR.
APPLICATION FILED JULY 28, 1914.
1,148,361.
Patented July 27, 1915.
Fig. 1.
Fig. 2.
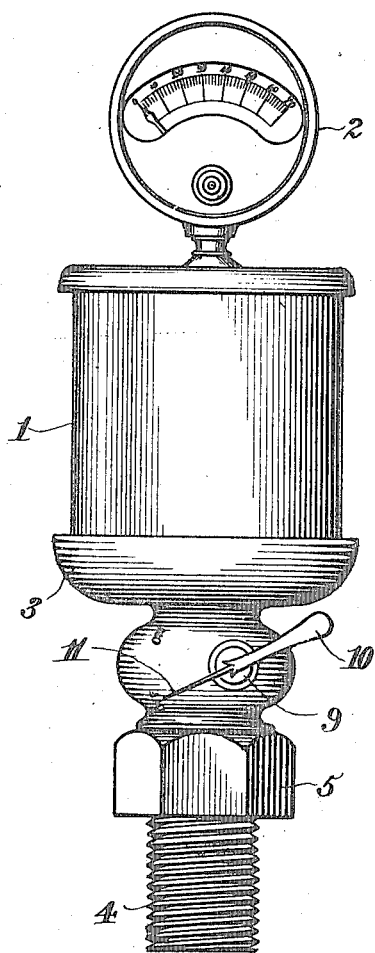
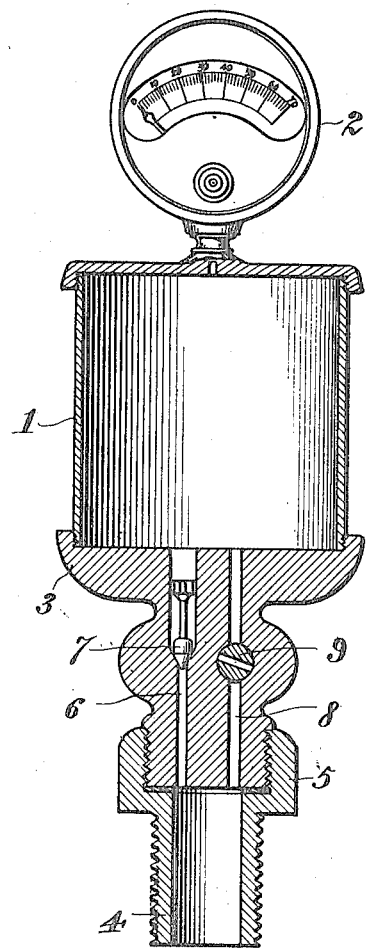
Witnesses:
C. Feinle, Jr.
C. A. Hines.
Inventor,
Louis H. Coxe.
By Victor J. Evans,
Attorney.

UNITED STATES PATENT OFFICE.

LOUIS H. COXE, OF SAN DIEGO, CALIFORNIA.

PRESSURE-INDICATOR.

1,148,361.  Specification of Letters Patent.  Patented July 27, 1915.

Application filed July 28, 1914. Serial No. 853,706.

*To all whom it may concern:*

Be it known that I, LOUIS H. COXE, a citizen of the United States, residing at San Diego, in the county of San Diego and State of California, have invented new and useful Improvements in Pressure-Indicators, of which the following is a specification.

This invention relates to pressure indicators for use in determining the working pressure within a cylinder of an engine, such as internal combustion engines, when such pressure is desired to be known.

The primary object of the invention is to provide an indicator which may be applied to the spark plug opening of an engine cylinder, and whereby, upon the operation of the engine, a sight indication of the working pressure within the cylinder may be obtained.

A further object of the invention is to provide an indicator which may be employed for determining the working pressure within a cylinder of any type of internal combustion engine, and which operates by gradual storage of pressure within the indicator until the pressure within the indicator equalizes that within the engine cylinder, whereby an accurate indicaton of the working pressure within the cylinder may be obtained.

The invention consists of the features of construction, combination and arrangement of parts herein fully described and claimed, reference being had to the accompanying drawing in which:—

Figure 1 is an elevational view of the device as applied for use, showing the relief valve in closed position. Fig. 2 is a vertical section through the device, showing the relief valve in open or relief position.

The device comprises a pressure chamber 1, with the upper portion of which communicates a pressure gage 2 or other suitable sight-reading pressure indicating device. The base of the pressure chamber 1 is integral with or suitably connected to a bracket or head 3 provided with a suitable attaching fitting, such as a tubular screw stem 4 provided with an angular collar or head 5 threaded or swiveled to said bracket. The tubular stem 4 is adapted to fit within the spark plug opening of an engine cylinder, and the collar or head 5 is of a form to receive a wrench whereby the stem may be screwed in or out. The fitting may be detached from the bracket, so that fittings to suit different size spark plug openings may be employed upon one and the same indicator.

The bracket 3 is provided with a pressure flow duct or passage 6 communicating at its upper end with the cylinder 1 and at its lower end with the stem 4, which duct or passage is controlled by an upwardly opening check valve 7. The bracket is also provided with a relief passage 8 communicating at its upper end with the cylinder and at its lower end with the stem 4. This passage 8 is controlled by a rotary plug 9 having an operating handle 10 and an indicating hand or pointer 11, the latter being adapted to coöperate with suitable indications, such as "Off" and "On" on the exterior of the bracket, to indicate when the valve is in open and closed positions.

In practice, the device is applied to the engine cylinder whose working pressure is to be determined by removing the spark plug therefrom and fitting the stem 4 within the spark plug opening, after which the valve 9, if open, is moved to closed position and the engine operated on the remaining cylinders or by hand. The pressure from the cylinder will pass upward through the duct 6 and raise the valve 7 and will be stored in the chamber 1, being held in said chamber by said check valve, which opens on each working stroke of the piston, until the pressures in the cylinder and chamber 1 are equal, whereupon a direct reading of the working pressure of the cylinder may be taken from the gage or indicator 2. By this means the working pressure of the cylinders of any combustible engine may be determined in a ready and convenient manner. After the working pressure of the cylinder is ascertained, the relief valve 9 is opened to allow the pressure to vent from the chamber 1, after which the device may be removed and the spark plug of the engine cylinder reinserted.

The device will be found of value whenever it is desired to determine the working action of the cylinders of any type of internal combustion engine, and by the use of proper fittings the device may be applied to any cylinder for the designed purpose.

I claim:—

A device for determining the working pressure within an engine cylinder, comprising a cylinder forming the side wall of a pressure chamber, a head detachably closing the top of said pressure chamber and provided with a pressure gage communicating therewith, a head detachably closing the bottom of the pressure chamber and having a bracket formed integral therewith, said bracket being provided with a reduced externally threaded lower end, and having a pair of continuous, parallel longitudinal passages extending through said head and bracket and communicating at their upper ends with the pressure chamber, one of said passages being provided with a circular enlargement and the other of said passages being diametrically enlarged at its upper end and provided with a valve seat, a rotary valve fitted in the enlargement of the first-named passage and adjustable to control the latter, and a gravity movable check valve arranged in the enlarged portion of the other passage and adapted to engage said valve seat to control said passage.

In testimony whereof I affix my signature in presence of two witnesses.

LOUIS H. COXE.

Witnesses:
W. L. FLAGG,
H. D. W. FLAGG.